United States Patent
Bi et al.

(10) Patent No.: US 11,682,429 B2
(45) Date of Patent: *Jun. 20, 2023

(54) SYSTEM AND METHOD FOR WRITE-RETRY MANAGEMENT

(71) Applicant: Seagate Technology LLC, Fremont, CA (US)

(72) Inventors: Qiang Bi, Shugart (SG); Jian Qiang, Shugart (SG); WenXiang Xie, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,558

(22) Filed: Jan. 25, 2022

(65) Prior Publication Data

US 2022/0223177 A1 Jul. 14, 2022

Related U.S. Application Data

(63) Continuation of application No. 17/061,365, filed on Oct. 1, 2020, now Pat. No. 11,264,056.

(51) Int. Cl.
| | |
|---|---|
| G11B 5/09 | (2006.01) |
| G11B 20/18 | (2006.01) |
| G11B 20/10 | (2006.01) |

(52) U.S. Cl.
CPC ........ *G11B 20/1889* (2013.01); *G11B 20/105* (2013.01)

(58) Field of Classification Search
None
See application file for complete search history.

(56) References Cited

U.S. PATENT DOCUMENTS

| | | | | |
|---|---|---|---|---|
| 8,037,348 | B2 * | 10/2011 | Wei | G06F 11/1441 |
| | | | | 714/6.32 |
| 11,264,056 | B1 * | 3/2022 | Bi | G11B 20/105 |
| 2004/0042105 | A1 * | 3/2004 | Cho | G11B 19/04 |
| | | | | 360/75 |
| 2006/0034008 | A1 * | 2/2006 | Kojima | G11B 20/1816 |
| 2006/0233077 | A1 * | 10/2006 | Yu | G11B 27/36 |
| 2008/0144209 | A1 | 6/2008 | Maruchi et al. | |
| 2009/0128945 | A1 * | 5/2009 | Ding | G11B 19/042 |
| | | | | 360/60 |
| 2013/0031406 | A1 * | 1/2013 | Cho | G11B 20/18 |
| | | | | 714/1 |
| 2013/0038961 | A1 * | 2/2013 | Song | G11B 20/1883 |
| 2013/0166973 | A1 * | 6/2013 | Sakurai | G11B 20/18 |
| | | | | 714/718 |
| 2015/0278019 | A1 | 10/2015 | Fagiano et al. | |
| 2016/0034342 | A1 | 2/2016 | Toh et al. | |
| 2016/0170852 | A1 | 6/2016 | Fagiano et al. | |

* cited by examiner

*Primary Examiner* — Peter Vincent Agustin
(74) *Attorney, Agent, or Firm* — Holzer Patel Drennan

(57) ABSTRACT

The technology disclosed herein pertains to a system and method for managing write failures in a disc drive. Implementations disclosed herein provide a method including monitoring write fault events per sector for a storage device, in response to a write fault event, updating a write fault repeat count table, wherein the repeat count table tracks a number of write fault repeat counts per sector, comparing a write fault repeat count for a sector to a predetermined threshold write fault repeat count, and in response to determining that the write fault repeat count for a sector is above the predetermined threshold write fault repeat count, performing a write-reassign operation.

20 Claims, 5 Drawing Sheets

SYSTEM AND METHOD FOR WRITE-RETRY MANAGEMENT

CROSS REFERENCE TO RELATED APPLICATIONS

This application is a continuation of and claims benefit of priority to U.S. patent application Ser. No. 17/061,365 filed on Oct. 1, 2020, and entitled SYSTEM AND METHOD FOR WRITE-RETRY MANAGEMENT, which is incorporated herein by reference in its entirety.

BACKGROUND

The present disclosure relates to a storage device and a computer system, and particularly, to a method for controlling a write operation when an error occurs during a write operation. A disk drive, a type of storage devices for storing data, is configured to operate by reading data to or writing data from a storage medium in response to a command generated from a host device, such as a computer. Disc drives usually store data by sectors, where the sectors are identified by their logical block addresses (LBAs). Various writing methods are being researched to enhance data writing efficient of the disk drive, especially in presence of one or more writing failures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a system and method for managing write failures in a disc drive. Implementations disclosed herein provide a method including monitoring write fault events per sector for a storage device, in response to a write fault event, updating a write fault repeat count table, wherein the repeat count table tracks a number of write fault repeat counts per sector, comparing a write fault repeat count for a sector to a predetermined threshold write fault repeat count, and in response to determining that the write fault repeat count for a sector is above the predetermined threshold write fault repeat count, performing a write-reassign operation.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

A hard disk drive performs a write operation to store data in a sector of a magnetic storage medium. Where the write operation is unsuccessful, the hard disk drive performs a write-retry operation. In the write-retry operation, the hard disk drive makes a further attempt to store the data. Specifically, a write-retry may be needed when a disc drive's writer encounters unforeseen problem. Examples of such unforeseen problems may include a servo fault, a media defect, a vibration, etc. As more write retries are attempted, they may impact disc drive's write throughput. Furthermore, write-retry may also cause more encroachment in adjacent track, which increases risk of data integrity.

Implementations described herein provide a method for managing write failures in a disc drive. Some implementations of disc drives provide for a write-retry scheme that consists of a pre-defined sequence for different kinds of tweaks. In alternative implementations disclosed herein, the selected tweak may not be optimized due to lack of recognition of internal/external conditions. Implementations disclosed herein optimizes write-retry sequence in a smart way by adding certain recognition of internal/external conditions in determining the write-retry. For example, the write-retry may be selected in view of vibration of a circuit board for the disc drive, position error signal (PES), etc.

Figure 1:
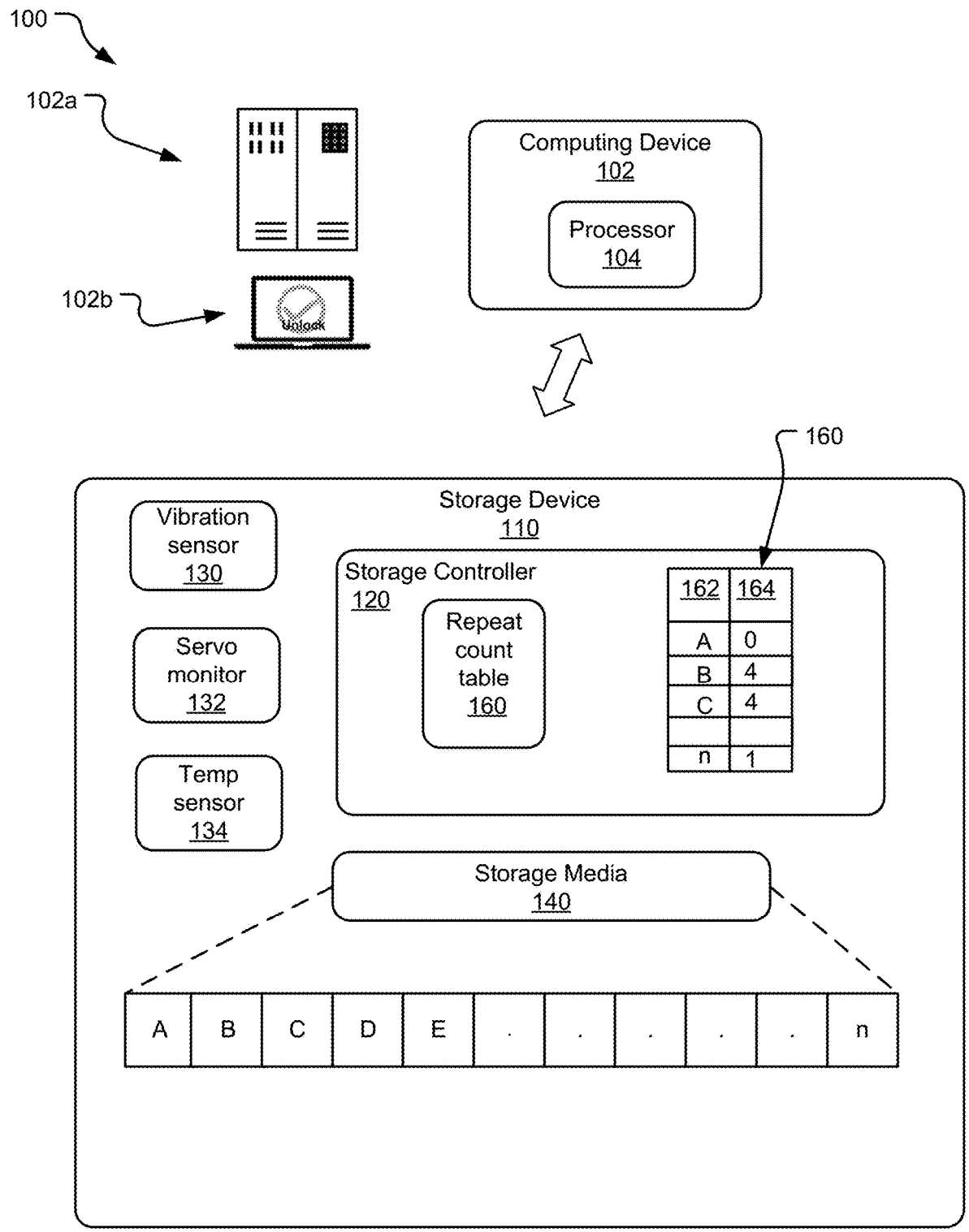
FIG. 1 illustrates an example block diagram of a system for managing write failures in a disc drive.

FIG. 1 illustrates an example block diagram of a system 100 for managing write failures in a disc drive. Specifically, the system 100 illustrates a computing device 102 that is communicatively connected to a storage device 110 configured with one or more implementations for managing write failures and write retries in a manner disclosed herein. The computing device 102 may be any computing device that uses a disc drive, such as a desk top computer 102a, a laptop computer 102b, or other computing devices that may serve as servers, cloud data storage computing devices, etc. A processor 104 of the computing device 102 may communicate with the storage device 110 to send one or more write commands to write data on the storage device 110.

The storage device 110 may be any storage device such as a hard disc drive (HDD), an optical disc drive, or other storage device. For example, the storage device 110 may an HDD that stores data on magnetic media using conventional magnetic recording (CMR), shingled media recording (SMR), etc. The storage device 110 may include a storage controller 120 that receives the read and write commands from the computing device 102 and writes them to storage media 140. The storage media 140 may be magnetic storage media of a magnetic disc drive. The storage media 140 may be logically organized in a number of sectors. For example, on s disc drive, a wedge of media between two predetermined diameters may be specified to be a sector.

The storage controller 120 may logically map the sectors of the storage media 140 to logical block addresses (LBAs). For example, in the illustrated implementation, various sectors of the storage media 140 are logically associated with LBAs A, B, C, n. The storage controller 120 takes the write command from the computing device 102 and maps various write data with various LBAs. Subsequently, a write head including a writer writes the data on the storage media that is associated with the LBAs.

In one implementation, as the write head writes the data to a given sector of the storage media 140, various factors may result in a write fault. For example, the media of a target sector may be damaged. Alternatively, the write head may be not be able to write the data at the target media sector due to vibration caused to the storage device 110. Yet alternatively, a servo monitor 132 associated with the storage device 110 may indicate that the position error signal (PES) associated with the position of the writer is too large for the write operation to be performed. Specifically, the PES, which is proportional to the relative difference of the positions of the center of the read/write head and the nearest track center, is a corrective signal providing an indication of which direction the head should be moved to during either track seeking or track following functions.

In the illustrated implementation of the storage device 110, in response to encountering a write fault event, the storage controller 120 updates a write-fault table 160. For example, if a write fault occurs when attempting to write data to LBA C, if a write fault is encountered, the value of the write-fault counter for LBA C is increased. The current values of for write-faults for various LBAs 162 is indicated by a repeat count 164. In response to the write-fault, the storage controller 120 also collects servo data from the servo monitor 132, vibration data from the vibration sensor 130, temperature data from a temperature sensor 134, etc.

Subsequently, the storage controller 110 compares the repeat count 164 for various LBAs 162 against a repeat count threshold value. In one implementation, the repeat count threshold value may be predetermined. As an example, the repeat count threshold value may be three. In this case, the current values of repeat counts 164 for various LBAs 162 are compared against such threshold value and if for any LBA 162, the repeat count value 164 is higher than such a threshold, a write reassign operation may be performed. For example, such write reassign operation may re-assign the write operation to a different LBA. As an example, given that the repeat count value 164 for LBA C is four, which is higher than the repeat count threshold value and as a result, the storage controller 110 may reassign the write operation to another LBA, such as LBA A. In one implementation, such reassignment is made to an LBA that has low or zero repeat count value.

If the storage controller 110 determines that the repeat count for the LBA where the write fault occurred is not above the threshold, subsequently, the storage controller 110 may compare the operational data to a threshold. For example, the vibration data is compared to a vibration threshold. When vibration level is above the threshold indicating presence of vibration, certain types of write-retry could be more efficient, such as a bare write-retry or a seek away write-retry, the storage controller 110 may re-arrange the sequence of write-retry by give priority and more time to favorable types of write-retry. However, if vibration is not presented, the storage controller may give priority and more time to other types of write-retry, such as a servo flaw write-retry, single sector write-retry, etc.

Figure 2:
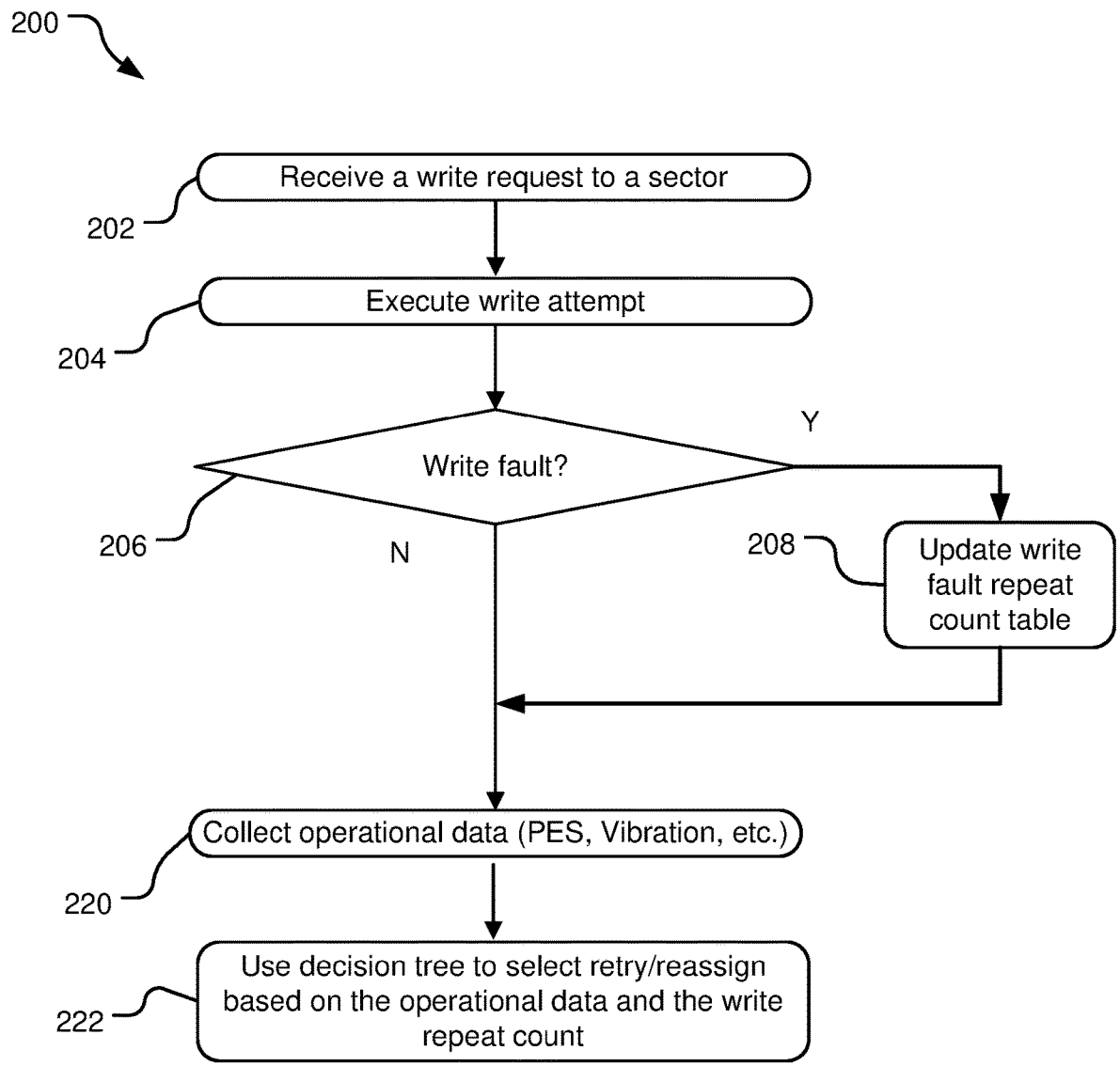
FIG. 2 illustrates example operations for managing write failures in a disc drive based on write fault counts.

FIG. 2 illustrates example operations 200 for managing write failures in a disc drive based on write fault counts. Specifically, an operation 202 receives a data write request to a sector. For example, the write request may be directed to a specific LBA, such as an LBA x. Subsequently, an operation 204 executes a write attempt to the sector, such as the LBA x. An evaluation operation 206 evaluates the results of the write attempt to determine if the write attempt to LBA x resulted in a write fault. If there was a write fault, an operation 208 updates a repeat count table. For example, the repeat count table may keep track of write faults per sector. In this implementation, the write fault count for LBA x is incremented by one.

Subsequently, an operation 220 collects various operational data about the storage device. For example, such operational data may include servo data from a servo monitor, PES data, vibration data for the storage device circuit board vibration, temperature data for the storage device temperature, etc. An operation 222 uses a decision tree to select a write-retry or to reassign the write to a different sector. For example, the decision tree at operation 222 may use the write fault repeat count and compare it against a threshold and use the operational data to decide whether to re-assign the write to a different sector or to attempt one of various alternative write-retries. Examples, of such alternate write retries may include a bare write-retry, a seek away write-retry, a servo flaw write-retry, a single sector write-retry, etc.

Figure 3:
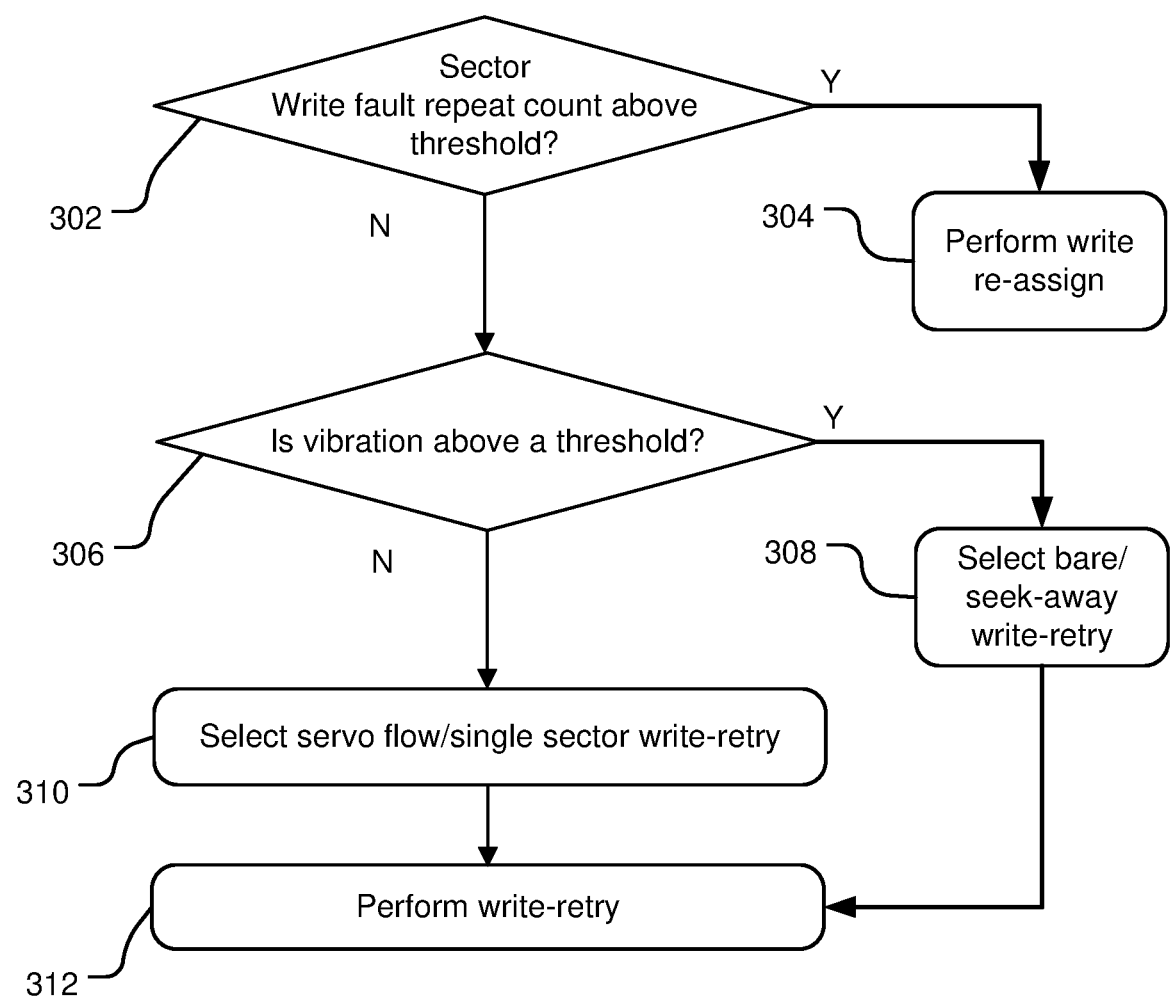
FIG. 3 illustrates alternative example operations for managing write failures in a disc drive based on write fault counts and disc drive vibration measurements.

FIG. 3 illustrates alternative example operations 300 for managing write failures in a disc drive based on write fault counts and disc drive vibration measurements. Specifically, the operations 300 illustrate a decision tree that may use the repeat count table and various operational measurements to determine whether a write re-assign or a write-retry operation is to be performed. An operation 302 evaluates the sector repeat count for the sector where a write fault is encountered. Specifically, the value of the repeat count is compared to a threshold value and if the repeat count is above the threshold, a write re-assign is selected to be performed at an operation 304.

If the operation 302 determines that the repeat count is not above the threshold, an operation 306 evaluates the vibration measurement of a circuit board for the storage device. If the vibration is above a threshold vibration level, then an operation 308 selects a first type of a write-retry operation. For example, the first type of write-retry operation may be more efficient and/or more relevant than a second type of write-retry operation. Example of the first type of a write-retry operation may be a bare write-retry or a seek-away write-retry operation for the next write-retry for that sector. On the other hand, if the vibration is not above the threshold, an operation 310 selects a second type of write-retry operation. Example of the second type of write-retry operation may be servo flaw or a single sector write-retry for the next write-retry for that sector.

Figure 4:
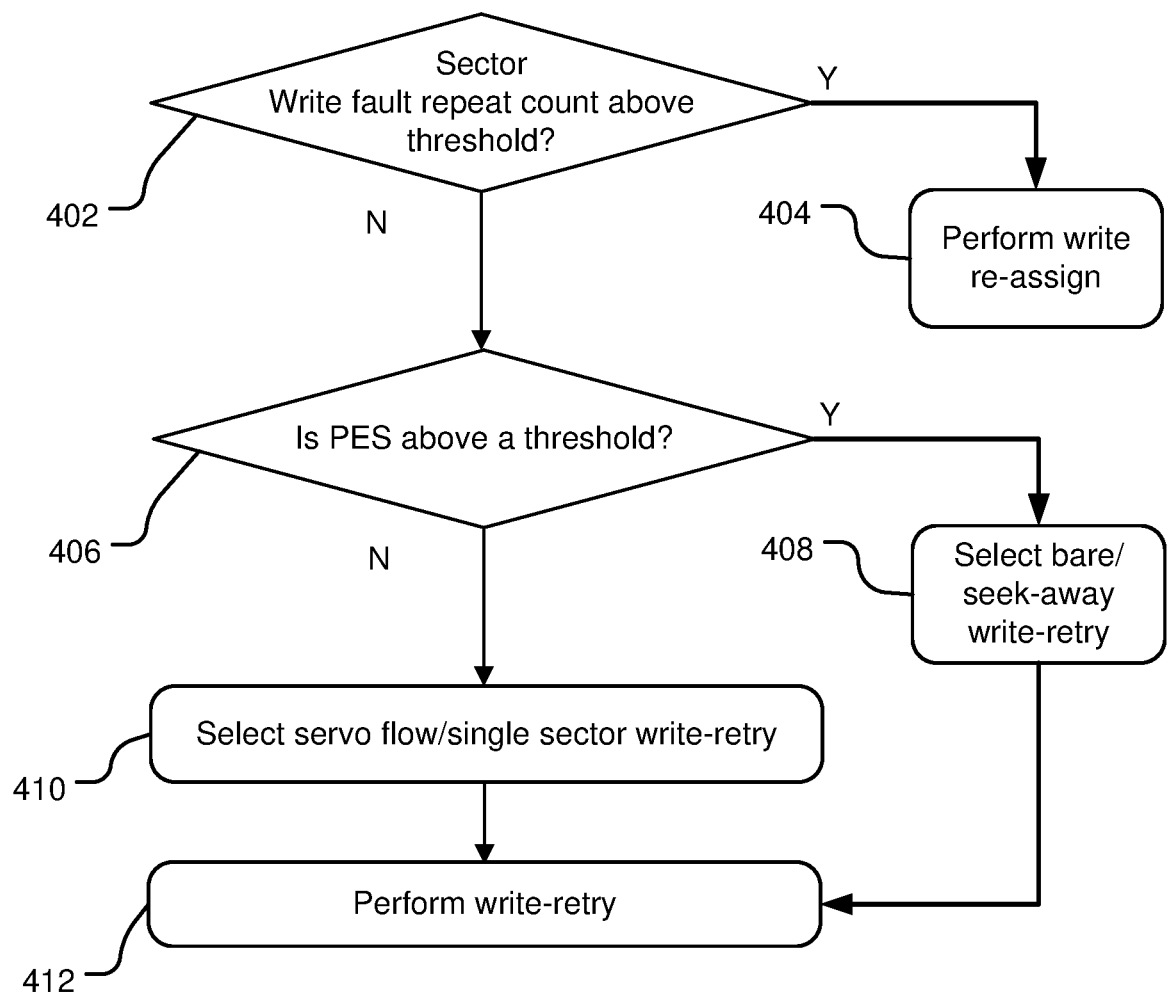
FIG. 4 illustrates alternative example operations for managing write failures in a disc drive based on write fault counts and disc drive position error signal (PES) measurements.

FIG. 4 illustrates alternative example operations 400 for managing write failures in a disc drive based on write fault counts and disc drive position error signal (PES) measurements. Specifically, the operations 400 illustrate a decision tree that may use the repeat count table and various operational measurements to determine whether a write re-assign or a write-retry operation is to be performed. An operation 402 evaluates the sector repeat count for the sector where a write fault is encountered. Specifically, the value of the repeat count is compared to a threshold value and if the repeat count is above the threshold, a write re-assign is selected to be performed at an operation 404.

If the operation 402 determines that the repeat count is not above the threshold, an operation 406 evaluates the PES measurement of the storage device. If the PES is above a threshold PES, then an operation 408 selects a first type of a write-retry operation. For example, the first type of write-retry operation may be more efficient and/or more relevant than a second type of write-retry operation. Example of the first type of a write-retry operation may be a bare write-retry or a seek-away write-retry operation for the next write-retry for that sector. On the other hand, if the PES is not above the threshold, an operation 410 selects a second type of write-retry operation. Example of the second type of write-retry operation may be servo flaw or a single sector write-retry for the next write-retry for that sector.

Figure 5:
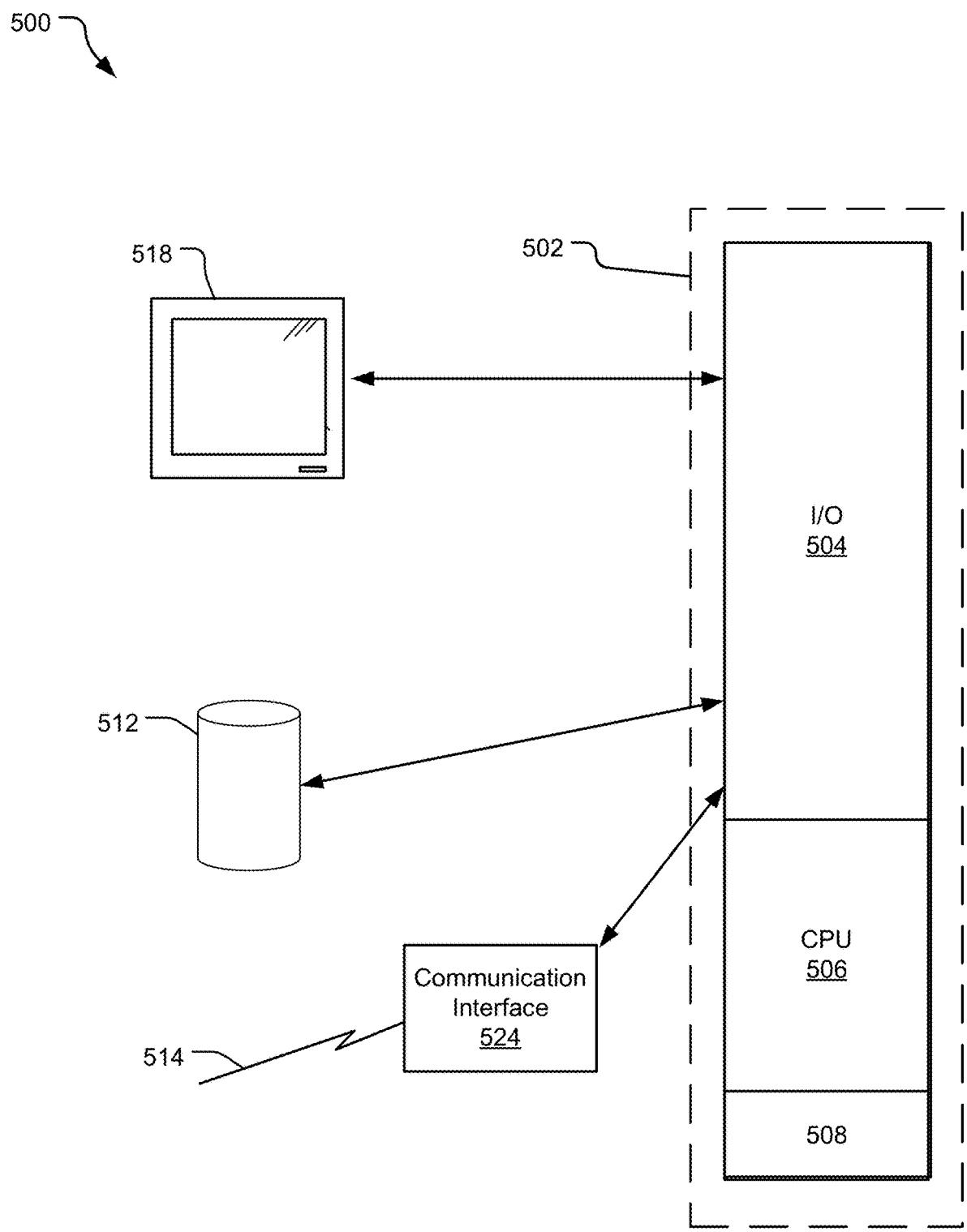
FIG. 5 illustrates an example processing system that may be useful in implementing the described technology.

FIG. 5 illustrates an example processing system 500 that may be useful in implementing the described technology. The processing system 500 is capable of executing a computer program product embodied in a tangible computer-readable storage medium to execute a computer process. Data and program files may be input to the processing system 500, which reads the files and executes the programs therein using one or more processors (CPUs or GPUs). Some of the elements of a processing system 500 are shown in FIG. 5 wherein a processor 502 is shown having an input/output (I/O) section 504, a Central Processing Unit (CPU) 506, and a memory section 508. There may be one or more processors 502, such that the processor 502 of the processing system 500 comprises a single central-processing unit 506, or a plurality of processing units. The processors may be single core or multi-core processors. The processing system 500 may be a conventional computer, a distributed computer, or any other type of computer. The described technology is optionally implemented in software loaded in memory 508, a storage unit 512, and/or communicated via a wired or wireless network link 514 on a carrier signal (e.g., Ethernet, 3G wireless, 8G wireless, LTE (Long Term Evolution)) thereby transforming the processing system 500 in FIG. 5 to a special purpose machine for implementing the described operations. The processing system 500 may be an application specific processing system configured for supporting a distributed ledger. In other words, the processing system 500 may be a ledger node.

The I/O section 504 may be connected to one or more user-interface devices (e.g., a keyboard, a touch-screen display unit 518, etc.) or a storage unit 512. Computer program products containing mechanisms to effectuate the systems and methods in accordance with the described technology may reside in the memory section 508 or on the storage unit 512 of such a system 500.

A communication interface 524 is capable of connecting the processing system 500 to an enterprise network via the network link 514, through which the computer system can receive instructions and data embodied in a carrier wave. When used in a local area networking (LAN) environment, the processing system 500 is connected (by wired connection or wirelessly) to a local network through the communication interface 524, which is one type of communications device. When used in a wide-area-networking (WAN) environment, the processing system 500 typically includes a modem, a network adapter, or any other type of communications device for establishing communications over the wide area network. In a networked environment, program modules depicted relative to the processing system 500 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 508 and/or the storage unit 512 and executed by the processor 502. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 508 and/or the storage unit 512 and executed by the processor 502.

The processing system 500 may be implemented in a device, such as a user device, storage device, IoT device, a desktop, laptop, computing device. The processing system 500 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. In a computing system, a method, comprising:
   comparing a write fault repeat count for a sector of a storage device to a predetermined threshold write fault repeat count;
   determining vibration of a circuit board of the storage device; and
   in response to determining that the vibration is above a threshold and that the write fault repeat count for a sector is below the predetermined threshold write fault repeat count, selecting a first type of a write-retry operation.

2. The method of claim 1, further comprising:
   determining vibration of a storage device circuit board;
   in response to determining that the vibration is above a threshold and that the write fault repeat count for a sector is below the predetermined threshold write fault repeat count, selecting the favorable type of a write-retry operation; and
   performing the write-retry operation using the favorable type of write-retry operation.

3. The method of claim 2, wherein the favorable the write-retry operation is at least one of a seek away retry operation and a bare re-try operation.

4. The method of claim 1, further comprising:
   determining vibration of a storage device circuit board;
   in response to determining that the vibration is below a threshold and that the write fault repeat count for a sector is below the predetermined threshold write fault repeat count, selecting other favorable type of a write-retry operation; and
   performing the write-retry operation using the selected other favorable type of write-retry operation.

5. The method of claim 4, wherein the other favorable type of the write-retry operation is at least one of a servo flaw retry operation and a single sector full re-try operation.

6. The method of claim 1, further comprising:
   determining position error signal (PES) level for the storage device;
   in response to determining that the PES level is above a threshold and that the write fault repeat count for a sector is below the predetermined threshold write fault repeat count, selecting a first type of a write-retry operation; and
   performing the write-reassign operation using the selected favorable type of write-retry operation.

7. The method of claim 6, wherein the favorable type of the write-retry operation is at least one of a seek away retry operation and a bare re-try operation.

8. The method of claim 1, wherein the predetermined threshold retry count is varied for each logical block address (LBA) of the storage device.

9. One or more non-transitory processor-readable storage media encoding processor-executable instructions for executing on a computer system a computer process, the computer process comprising:
   comparing a write fault repeat count for a sector of a storage device to a predetermined threshold write fault repeat count;
   determining vibration of a circuit board of the storage device; and
   in response to determining that the vibration is above a threshold and that the write fault repeat count for a sector is below the predetermined threshold write fault repeat count, selecting a first type of a write-retry operation.

10. The one or more non-transitory processor-readable storage media of claim 9, wherein the computer process further comprising performing the write-retry operation using the selected first type of write-retry operation.

11. The one or more non-transitory processor-readable storage media of claim 10, wherein the first type of the write-retry operation is at least one of a seek away retry operation and a bare re-try operation.

12. The one or more non-transitory processor-readable storage media of claim 9, wherein the computer process further comprising:
   in response to determining that the write fault repeat count for a sector of the storage device is above the predetermined threshold write fault repeat count, performing a write-reassign operation.

13. The one or more non-transitory processor-readable storage media of claim 9, wherein the computer process further comprising:
   in response to determining that the vibration of a circuit board of the storage device is below a threshold and that the write fault repeat count for a sector is below the predetermined threshold write fault repeat count, selecting other favorable type of a write-retry operation; and
   performing the write-retry operation using the selected other favorable type of write-retry operation.

14. The one or more non-transitory processor-readable storage media of claim 13, wherein the other favorable type of the write-retry operation is at least one of a servo flaw retry operation and a single sector full re-try operation.

15. A storage device, comprising:
   a sensor for determining vibration of a circuit board of the storage device; and
   a memory configured to store one or more computer readable instructions for executing on a computer system a computer process, the computer process comprising:
      comparing a write fault repeat count for a sector of a storage device to a predetermined threshold write fault repeat count;
      determining vibration of a circuit board of the storage device; and in response to determining that the vibration is above a threshold and that the write fault repeat count for a sector is below the predetermined threshold write fault repeat count, selecting a first type of a write-retry operation.

16. The storage device of claim 15, wherein the computer process further comprising performing the write-retry operation using the selected favorable type of write-retry operation.

17. The storage device of claim 16 wherein the favorable type of the write-retry operation is at least one of a seek away retry operation and a bare re-try operation.

18. The storage device of claim 15, wherein the computer process further comprising, in response to determining that the write fault repeat count for a sector is above the predetermined threshold write fault repeat count, performing a write-reassign operation.

19. The storage device of claim 15, wherein the computer process further comprising:
   in response to determining that the vibration is below a threshold and that the write fault repeat count for a sector is below the predetermined threshold write fault repeat count, selecting other favorable type of a write-retry operation; and
   performing the write-retry operation using the selected other favorable type of write-retry operation.

20. The storage device of claim 19, wherein the other favorable type of the write-retry operation is at least one of a servo flaw retry operation and a single sector full re-try operation.

* * * * *